(12) United States Patent
Sundararajan et al.

(10) Patent No.: US 10,197,077 B2
(45) Date of Patent: Feb. 5, 2019

(54) PRECISE CHOKE SYSTEMS AND METHODS

(71) Applicant: SRI Energy, Inc., Stafford, TX (US)

(72) Inventors: Alagarsamy Sundararajan, Sugar Land, TX (US); Aravindhan Rajamarthandan, Thanjavur (IN); Gayathri Srinivasa Ragavan, Trichy Urban (IN); Don Gramlich, Richmond, TX (US); Purnima Vegesna, Missouri City, TX (US)

(73) Assignee: SRI Energy, Inc., Stafford, TX (US)

( * ) Notice: Subject to any disclaimer, the term of this patent is extended or adjusted under 35 U.S.C. 154(b) by 0 days.

(21) Appl. No.: 15/807,972

(22) Filed: Nov. 9, 2017

(65) Prior Publication Data
US 2018/0128294 A1 May 10, 2018

Related U.S. Application Data

(60) Provisional application No. 62/420,257, filed on Nov. 10, 2016.

(51) Int. Cl.
*F15D 1/02* (2006.01)
*E21B 34/02* (2006.01)
(Continued)

(52) U.S. Cl.
CPC ............ *F15D 1/025* (2013.01); *E21B 34/02* (2013.01); *E21B 43/40* (2013.01); *F16K 47/08* (2013.01); *E21B 33/06* (2013.01)

(58) Field of Classification Search
CPC .......... F15D 1/025; F16K 47/08; E21B 33/06; E21B 34/02
(Continued)

(56) References Cited

U.S. PATENT DOCUMENTS 3,026,084 A * 3/1962 Bryant ................. F16K 3/0227
251/282
3,538,938 A * 11/1970 Volpin ..................... F16K 3/36
137/246.12
(Continued)

FOREIGN PATENT DOCUMENTS

| CN | 104089027 A | 10/2014 |
|---|---|---|
| DE | 3717128 A1 | 12/1988 |

(Continued)

OTHER PUBLICATIONS

MSP/DRILEX, Inc., "Valves," http://msp-drilex.us.com/valve.html, 2011, 7 pages.

(Continued)

*Primary Examiner* — James Hook
(74) *Attorney, Agent, or Firm* — Trop, Pruner & Hu, P.C.

(57) ABSTRACT

An embodiment includes a choke system comprising: a choke body; a gate having first and second sidewalls opposing one another; a first seat including a first channel and first conduits; a second seat coupling the second sidewall to the choke body and including a second channel; a third seat coupling the first sidewall to the choke body; a plug coupled to a bottom surface of the gate; a choke stem coupled to a top surface of the gate; wherein (a) the choke system is to convey fluid through the first channel and first conduits when the gate is open and fluid is pressurized in the second channel, and (b) the first conduits of the first seat have first long axes that are non-collinear with a long axis of the first channel. Other embodiments are described herein.

20 Claims, 13 Drawing Sheets

(51) Int. Cl.
*F16K 47/08* (2006.01)
*E21B 43/40* (2006.01)
*E21B 33/06* (2006.01)

(58) Field of Classification Search
USPC .......................... 138/94, 94.3, 94.5
See application file for complete search history.

(56) References Cited

U.S. PATENT DOCUMENTS

| | | | | |
|---|---|---|---|---|
| 3,780,982 | A * | 12/1973 | Kemp | F16K 3/0209 |
| | | | | 137/625.33 |
| 3,880,399 | A * | 4/1975 | Luthe | F16K 47/02 |
| | | | | 137/625.37 |
| 4,029,294 | A * | 6/1977 | McCaskill | F16K 3/36 |
| | | | | 137/246.12 |
| 4,264,054 | A * | 4/1981 | Morrill | F16K 3/0236 |
| | | | | 251/328 |
| 4,337,788 | A | 7/1982 | Seger | |
| 4,540,022 | A * | 9/1985 | Cove | E21B 34/02 |
| | | | | 137/625.3 |
| 4,971,099 | A | 11/1990 | Cyvas | |
| 5,074,519 | A | 12/1991 | Pettus | |
| 5,133,383 | A | 7/1992 | King | |
| 5,542,645 | A * | 8/1996 | Beson | F16K 3/205 |
| | | | | 251/172 |
| 5,706,856 | A * | 1/1998 | Lancaster | F16K 47/08 |
| | | | | 137/556.3 |
| 5,758,692 | A * | 6/1998 | Crane | F16K 3/0227 |
| | | | | 138/44 |
| 5,957,208 | A | 9/1999 | Schnatzmeyer | |
| 6,105,614 | A | 8/2000 | Bohaychuk et al. | |
| 6,536,473 | B2 | 3/2003 | Bohaychuk | |
| 6,782,949 | B2 | 8/2004 | Cove et al. | |
| 7,237,472 | B2 | 7/2007 | Cove | |
| 7,287,739 | B2 | 10/2007 | Arnison et al. | |
| 7,308,902 | B2 * | 12/2007 | Williams | E21B 34/04 |
| | | | | 137/15.18 |
| 7,469,720 | B2 | 12/2008 | McCulloch et al. | |
| 8,171,958 | B2 | 5/2012 | Morreale | |
| 8,371,333 | B2 | 2/2013 | Bohaychuk | |
| 8,490,652 | B2 | 7/2013 | Bohaychuk et al. | |
| 9,458,941 | B2 | 10/2016 | Bohaychuk | |
| 2007/0215387 | A1 | 9/2007 | Sims et al. | |
| 2009/0320931 | A1 * | 12/2009 | Wears | F16K 47/08 |
| | | | | 137/15.18 |
| 2015/0292629 | A1 | 10/2015 | Elliott et al. | |
| 2016/0010754 | A1 | 1/2016 | Minnock et al. | |
| 2016/0186876 | A1 | 6/2016 | Hopper | |
| 2016/0223089 | A1 | 8/2016 | Nijland | |
| 2016/0327165 | A1 | 11/2016 | Sundararajan | |
| 2017/0051845 | A1 * | 2/2017 | Bohaychuk | F16K 47/08 |

FOREIGN PATENT DOCUMENTS

| | | |
|---|---|---|
| DE | 10004913 A1 | 8/2001 |
| EP | 2042685 B1 | 8/2012 |
| GB | 2094861 A | 9/1982 |
| GB | 2533636 A | 6/2016 |
| GB | 2533638 A | 6/2016 |

OTHER PUBLICATIONS

The International Searching Authority, Notification of Transmittal of the International Search Report and the Written Opinion of the International Searching Authority dated Feb. 27, 2018 in International Application No. PCT/US/2017/060779, 20 pages.

* cited by examiner

PRECISE CHOKE SYSTEMS AND METHODS

CROSS-REFERENCE TO RELATED APPLICATION

This application claims priority to U.S. Provisional Patent Application No. 62/420,257 filed on Nov. 10, 2016 and entitled "Precise Choke Systems and Methods", the content of which is hereby incorporated by reference.

TECHNICAL FIELD

Embodiments of the invention are in the field of oil field equipment and, in particular, choke systems.

BACKGROUND

A "choke" is a device incorporating an orifice that is used to control fluid flow rate or downstream system pressure. Chokes are available in several configurations for both fixed and adjustable modes of operation. Adjustable chokes enable the fluid flow and pressure parameters to be changed to suit process or production requirements. Fixed chokes do not provide this flexibility, although they are more resistant to erosion under prolonged operation or production of abrasive fluids.

More specifically, an adjustable choke is usually used in well control operations to reduce the pressure of a fluid from high pressure in the closed wellbore to atmospheric pressure. It may be adjusted (opened or closed) to closely control the pressure drop. Adjustable chokes are constructed to resist wear while high-velocity, solids-laden fluids are flowing by the restricting or sealing elements.

More specifically, a fixed choke is a device used to control the flow of fluids by directing flow through a restriction or hole of a fixed size. The fluid characteristics and the pressure differential across the choke determine the flow rate through a fixed choke.

A "bean choke" is a fixed choke used to control the flow of fluids, usually mounted on or close to the Christmas tree. A bean choke contains a replaceable insert, or bean, made from hardened steel or similar durable material. The insert is manufactured with a precise diameter hole that forms the choke through which all fluids must pass. Choke inserts are available in a complete range of sizes, generally identified by choke diameter stated in 64ths of an inch; for example, a "32 bean" is equivalent to a ½-in. choke diameter.

A "choke line" is a high-pressure pipe leading from an outlet on the blow out preventer (BOP) stack to the back-pressure choke and associated manifold. During well-control operations, the fluid under pressure in the wellbore flows out of the well through the choke line to the choke, reducing the fluid pressure to atmospheric pressure. In floating offshore operations, the choke and kill lines exit the subsea BOP stack and then run along the outside of the drilling riser to the surface. The volumetric and frictional effects of these long choke and kill lines must be considered to control the well properly.

A "choke manifold" includes a set of high-pressure chokes and associated piping that usually includes at least two adjustable chokes, arranged such that one adjustable choke may be isolated and taken out of service for repair and refurbishment while well flow is directed through the other one.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photomicrograph, may appear different while still incorporating the claimed structures of the illustrated embodiments. Moreover, the drawings may only show the structures useful to understand the illustrated embodiments. Additional structures known in the art may not have been included to maintain the clarity of the drawings. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical or electrical contact with each other and "coupled" may indicate elements co-operate or interact with each other, but they may or may not be in direct physical or electrical contact.

Applicant determined conventional choke systems have inadequate and imprecise flow control without a positive shut off. For example, after "break opening" even a slight increase in opening leads to choke operation that is similar to "full open". As a result, flow cannot be precisely controlled in such situations (i.e., a small adjustment of the choke nevertheless leads to a large increase in flow rather than a more desirable granular control of flow). Further, with conventional chokes the bore fluid enters into the body cavity even when the choke is "closed". This lessens packing life for elements exposed to high body cavity pressure.

In contrast, an embodiment provides precise flow control. The embodiment does so based on, for example, relatively small diameter holes (which vary in diameter in some embodiments) in sleeve 17 and cage 15 of FIG. 6. Because of these holes, a very small area is initially exposed for the fluid to flow. Having differently sized holes results in a device with an opening area that can be precisely controlled so the flow is precisely regulated with the movement of the cage. The embodiment provides one or more seals to prevent fluid from entering into the bore cavity. Such an embodiment avoids "wash out" (i.e., wearing down of a material, such as the materials of a choke stem or the metal faces of a choke body) and leakage.

Figure 2:
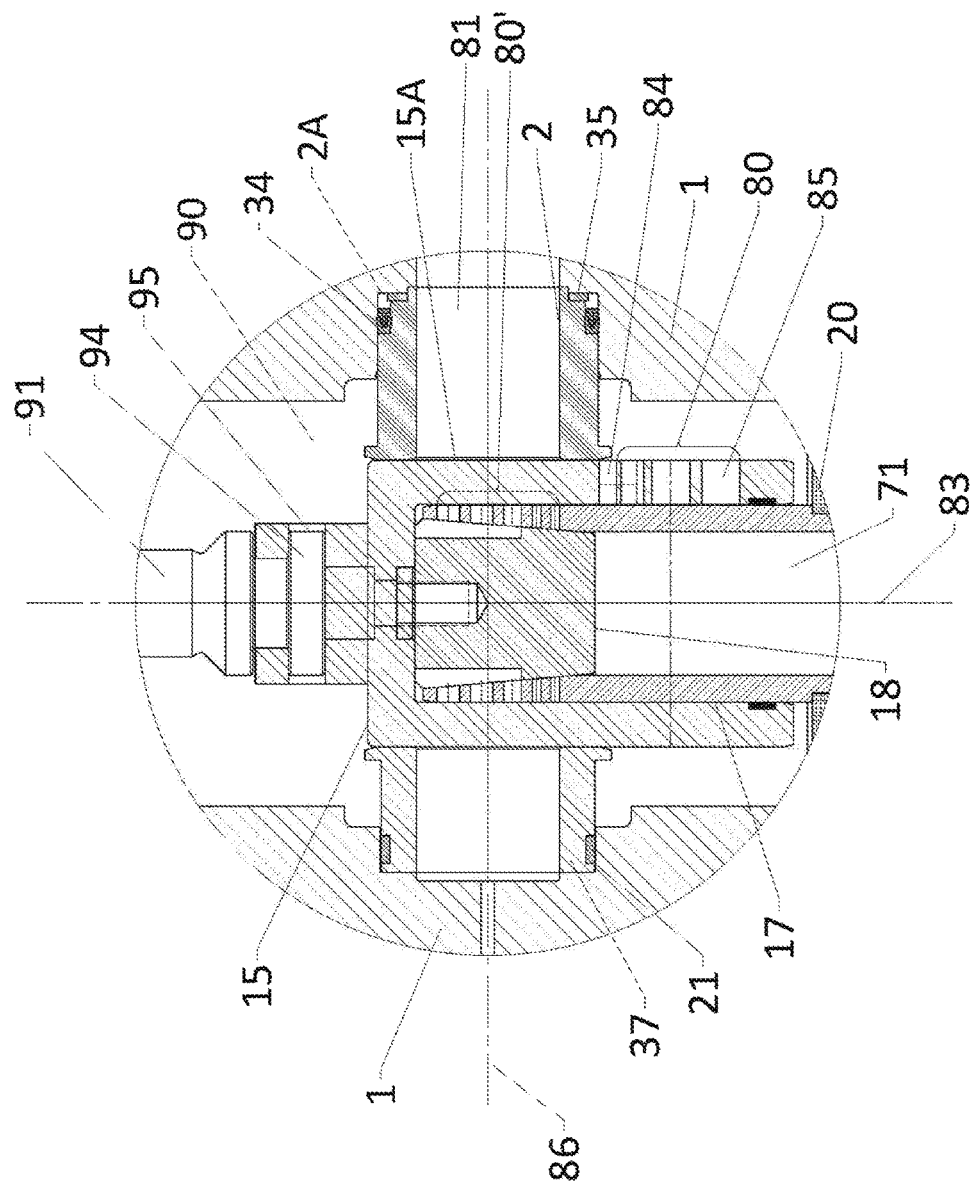
Figure 3:
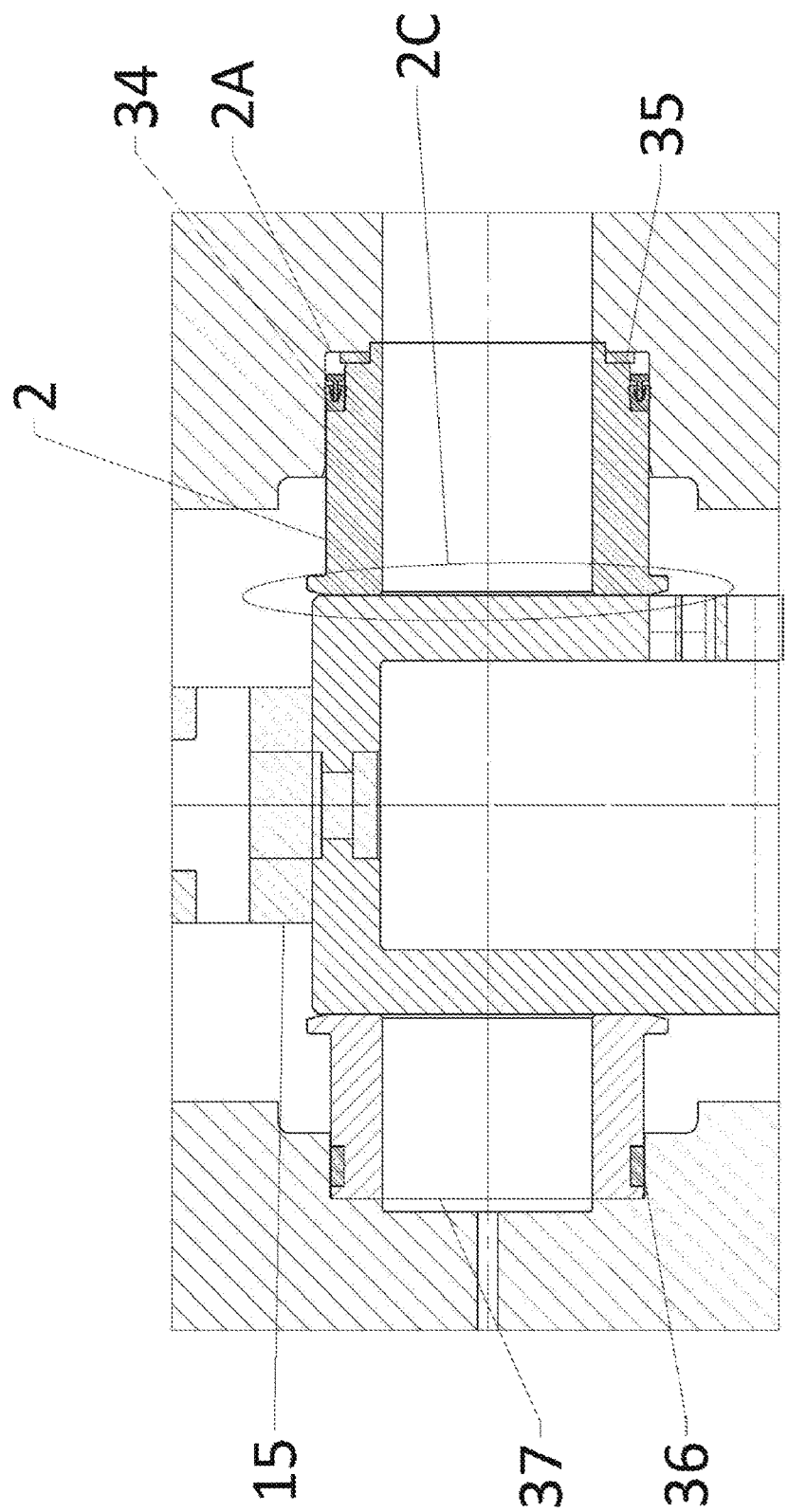

In FIG. 2, when the choke is in a closed condition, spring 35 (e.g., wave spring, disk spring, resilient member, and the like) located on the inlet side body pocket pushes seat 2 towards cage 15 with/without internal pressure forming a metal to metal seal between the seat and cage. This sealing is even more effective when there is internal pressure at the inlet side, but still exists even when there is no such pressure. For instance, as shown in FIG. 3 seal assembly 34 includes a "T" shaped portion. When the "T" shaped portion is contacted by high pressure fluid originating from the channel of seat 2, the "T" is forced towards the elastic member that is between the "T" portion and the seat 2. The force not only activates the seal of the elastic member the force also drives seat 2 towards cage 15 via the "T" member. This reinforces the metal to metal seal between the seat and cage. Thus, seal 2C (see circled area in FIG. 3) prevents fluid from entering into the body cavity when cage 15 is closed. This metal to metal seal forms a "positive" shut off.

In the embodiment of FIG. 2 fluid pressure is sealed from exiting in at least two points: (1) between cage 15 and seat 2, and (2) between plug 18 and sleeve 17. If pressure escapes between cage 15 and seat 2, the pressure is still sealed between plug 18 (e.g., tapered wall of plug) and sleeve 17 (e.g., tapered wall of sleeve). Such a design has dual sealing capacity and thereby avoids or lessens leaks. Further, such an embodiment leads to "positive shut off" (due to the seal between seat 2 and cage 15) so the packing life of elements (e.g., choke stem 91) exposed to body cavity pressure is improved.

For precise calculated flow control an embodiment has differently sized holes on the sleeve 17 and cage 15. Because of these holes (or more generally, conduits, in some embodiments), a very small area is initially exposed for the fluid to flow. Having differently sized holes the opening area can be more precisely controlled and the flow can be more precisely regulated with movement of the cage to a desired position.

Applicant further identified conventional chokes have problems with vibration. However, vibration problems are eliminated and/or lessoned due to the "floating cage model" that includes cage guide (or seat) 37 installed opposite seat 2. This cage guide supports cage 15 during flow and reduces vibrations and noise.

Thus, embodiments not only provide precise flow control and positive shutoff but such embodiments further provide vibration dampening. These advantages are provided based on, for example, sleeve 17, plug 18, spring 35, seat 2, cage guide 37, and cage 15. Embodiments are suitable anywhere normal or severe erosion conditions in oil and gas industry exist (or other industries that concern harsh fluid or high pressure fluid communication) because they lower maintenance needs due to enhanced sealing (e.g., positive shutoff).

In an embodiment a coating is applied to sleeve 17, cage 15, and/or plug 18. In an embodiment the coating includes a nitride, a carbide (e.g., tungsten carbide), and mixtures thereof.

Figure 1:
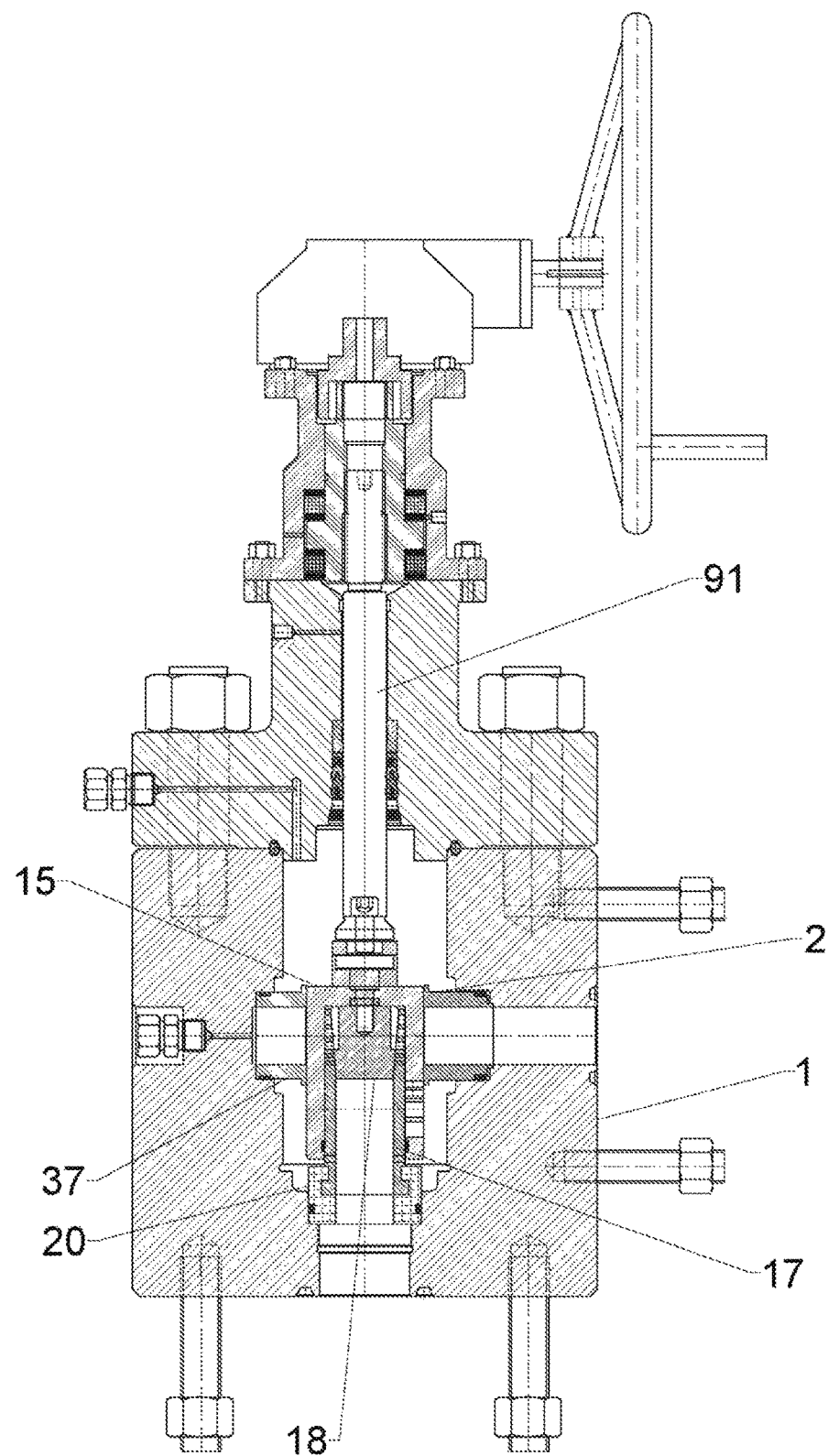
FIGS. 1-7 depict various views of a choke system in an embodiment.

FIG. 1 illustrates a choke assembly in an embodiment.

FIG. 2 illustrates the seat 2 and cage guide 37 (sometimes referred to herein as a seat) assemblies on either side of a cage 15 (in closed position) in an embodiment. The choke with both seat 2 and cage guide 37 provides an advantage over conventional systems (e.g., less vibration) by providing support on a plurality of sides of cage 15. Further, cage 15 has a flat surface 15A for sealing (see FIG. 9). Conventional systems typically have a round external surface. Cage 15 is a "floating" cage because "T" member 94 (of stem 91) inserts into slot 95 of cage with a coupling that allows the cage some movement (i.e., to float). This helps the floating component (e.g., cage 15) align itself with regard to components it couples to (e.g., sleeve 17) when moving (e.g., cage 15 moving up and down based on stem 91). With pressure inside the body cavity (e.g., within the channel of seat 2), seat 2 and cage guide 37 help cage 15 stay parallel to the seat 2 surfaces. This helps reduce vibrations. Cage15 moves linearly up and down.

FIG. 3 illustrates seat 2 and cage guide 37, which provide various seals. For example, seat-seal assembly 34 (such as, for example, a spring energized seal (e.g., OptiSeal®) from CDI Energy Products) expands when pressure is applied to the seal from within the channel of seat 2. Further, spring 35 pushes seat 2 against cage 15 to provide a metal-metal seal 2C when low pressure is in the channel of seat 2. The metal-metal seal 2C strengthens when pressure in the channel of seat 2 forces seat 2 towards cage 15 (e.g., by placing pressure against seal 34 which is then translated into pressure forcing seat 2 against cage 15). Seal assembly 34 and spring 35 are installed in the inlet side body pocket 2A (but not on the opposite side of plug 18, at least in some embodiments but such a spring is included on the opposite of plug 18 in the seat pocket opposing pocket 2A in other embodiments). The metal-metal seal 2C does not allow pressure to escape into the body cavity (e.g., where void 90 exists between the operating stem 91 and body 1 and/or within the channel of sleeve 17) thereby forming a positive shut off.

Wear ring 36 (see also ring 21 in FIG. 2 and/or ring 21 of FIG. 4) on the cage guide 37 reduces vibration on the cage guide thereby helping guide 37 smooth any movement of cage 15.

Figure 4:
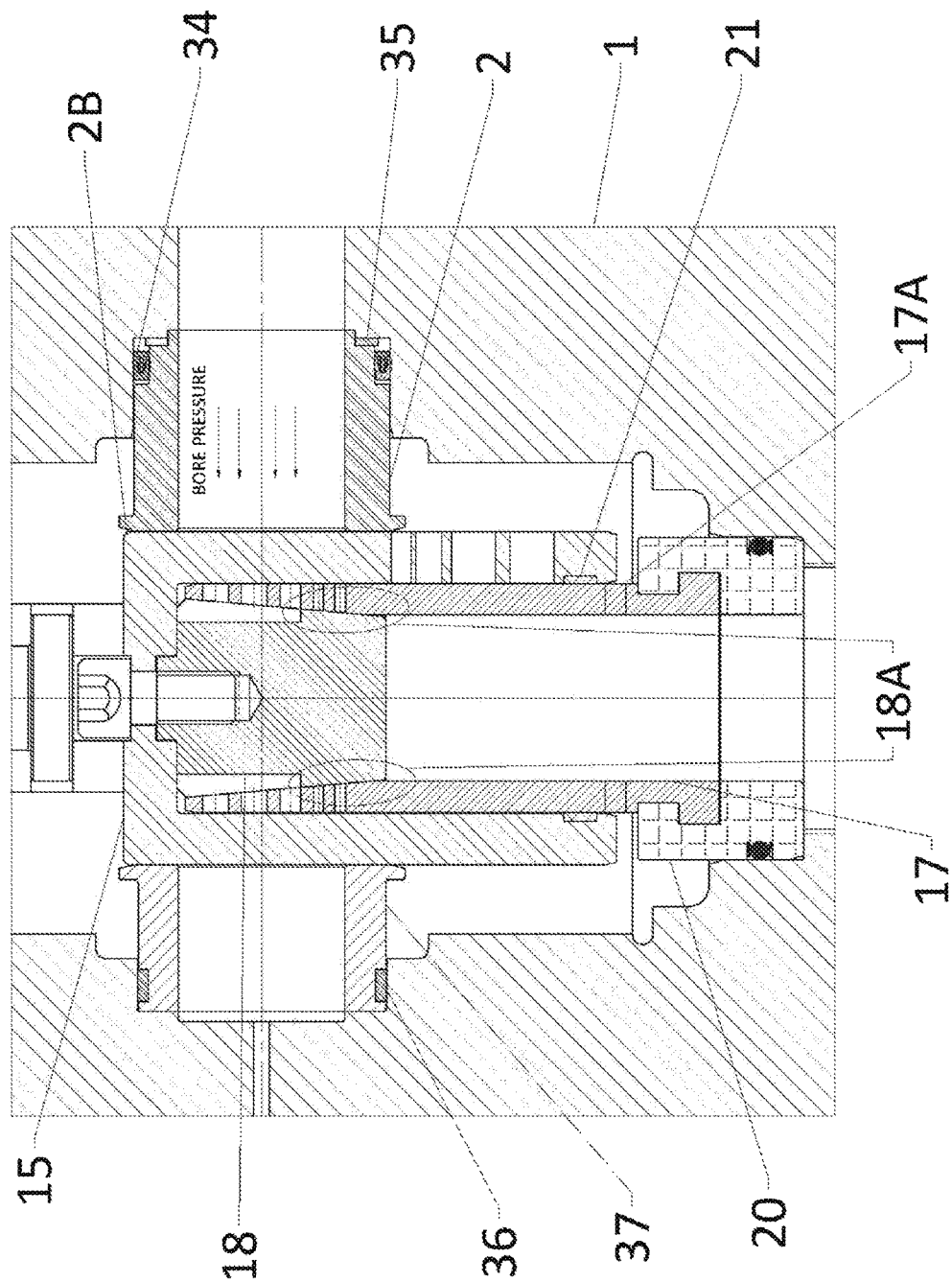

FIG. 4 illustrates the assembly of cage 15, seat 2, sleeve 17, and retainer 20 (in closed position) with pressure induced at the inlet side (e.g., see "BORE PRESSURE" in channel of seat 2). Cage 15 has differently sized holes (i.e., holes with different diameters) on the inlet side of the choke. Sleeve 17 also has holes (which are differently sized in some embodiments) on its top portion and the bottom end of sleeve 17 is attached to retainer 20. (The differently sized holes are only on one side of sleeve 17 in some embodiments.) Retainer 20 is threaded into the outlet bore of body 1. The sleeve 17 also has a hole 17A at its bottom to vent the pressure into the body cavity after closing the choke. When the choke is closed the tapered surface of plug 18 and the tapered surface of sleeve seat 17 come in contact with each other to form a secondary seal 18A. The taper provided on the seat face 2B provides a guide while installing the cage between the seat and cage guide.

Figure 5:
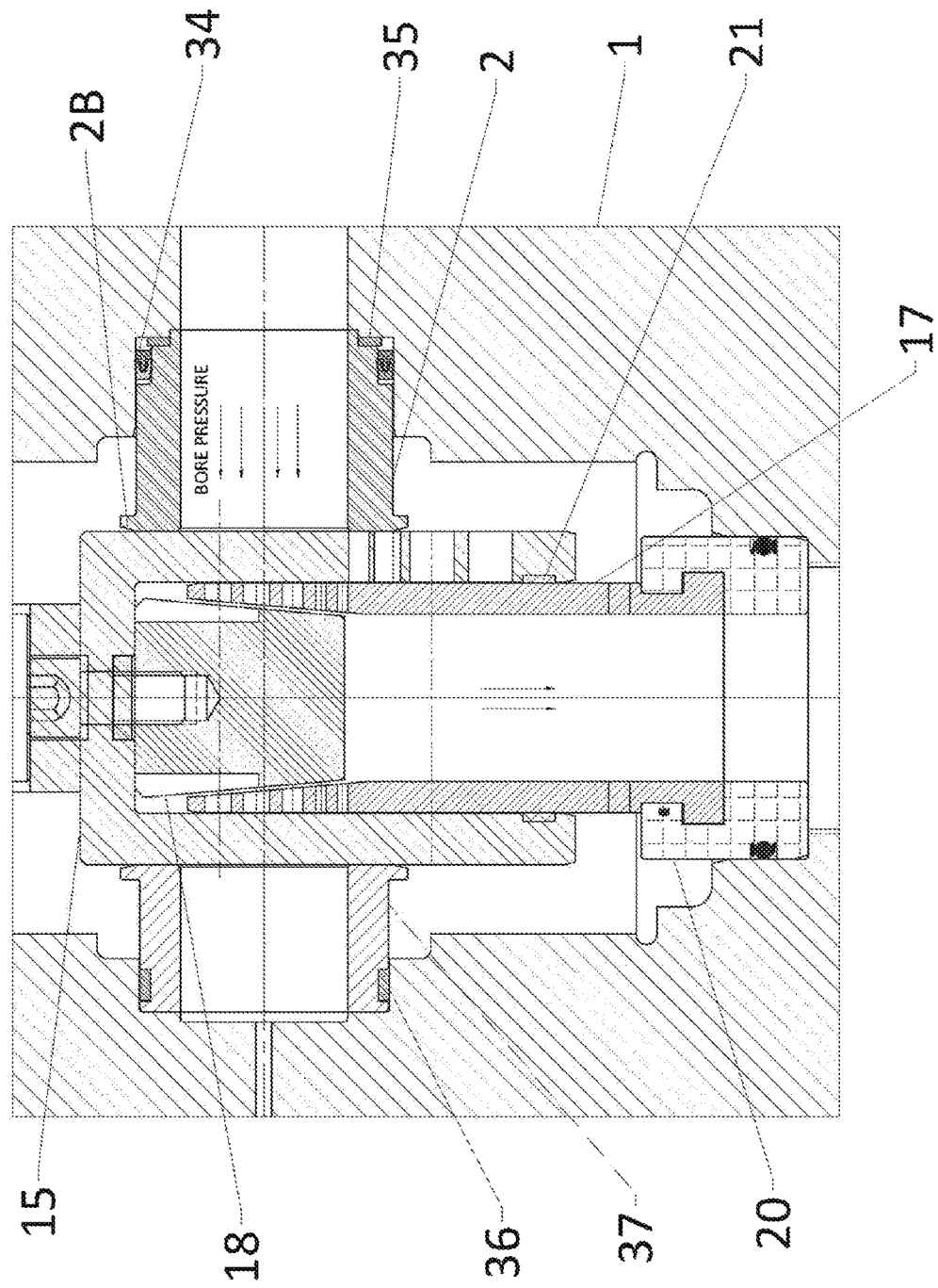

FIG. 5 illustrates an embodiment in the "brake open" position. Cage 15 and plug 18 both move forming a slight opening at the taper of sleeve 17 and plug 18. As a result fluid passes into the body cavity (e.g., channel of sleeve 17). Movement of the cage 15 determines fluid flow through the choke (which mainly depends on the number of holes aligned between cage 15 and sleeve 17). This helps provide precise calculated flow control.

Figure 6:
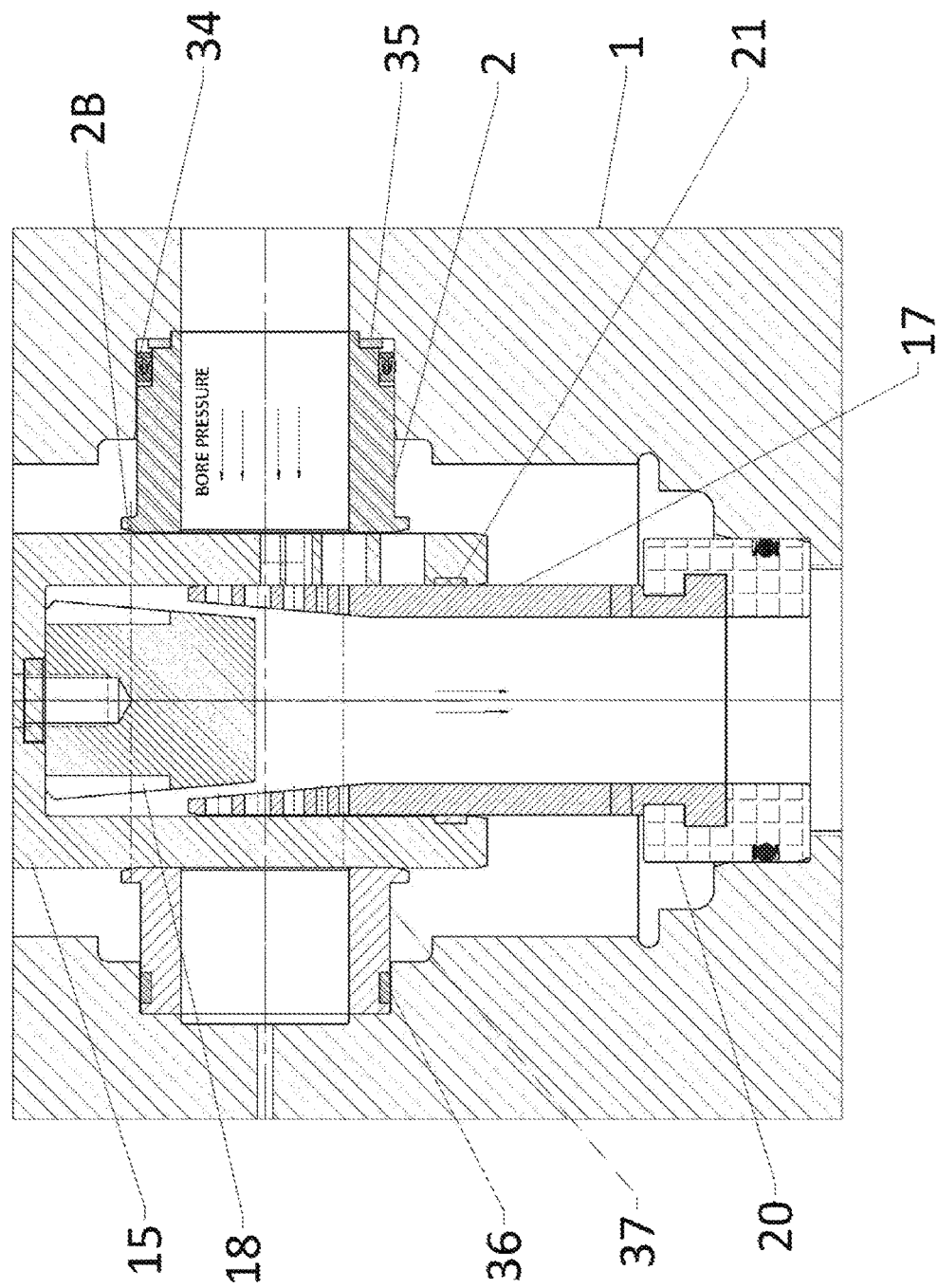

FIG. 6 illustrates the choke in a partially opened position with fluid flow. Flow depends on the number of holes exposed to the flow.

Figure 7:
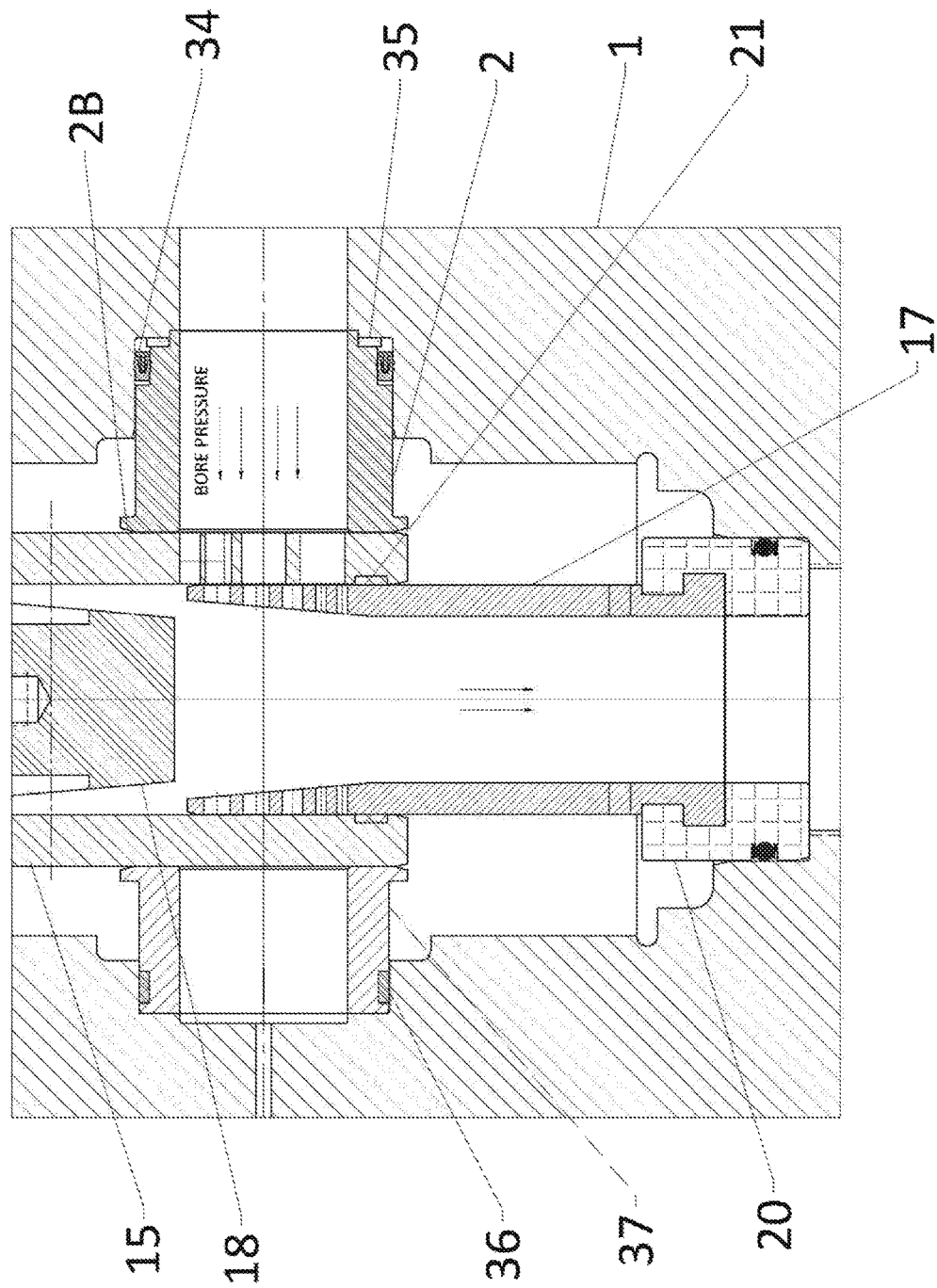

FIG. 7 illustrates the working of the choke in a full open position with fluid flow through the holes of cage 15 and sleeve 17. In a full open condition, all the holes (or many of the holes) on cage 15 coincide with the holes on the sleeve 17, thereby allowing maximum fluid to flow through the system.

Figure 8:
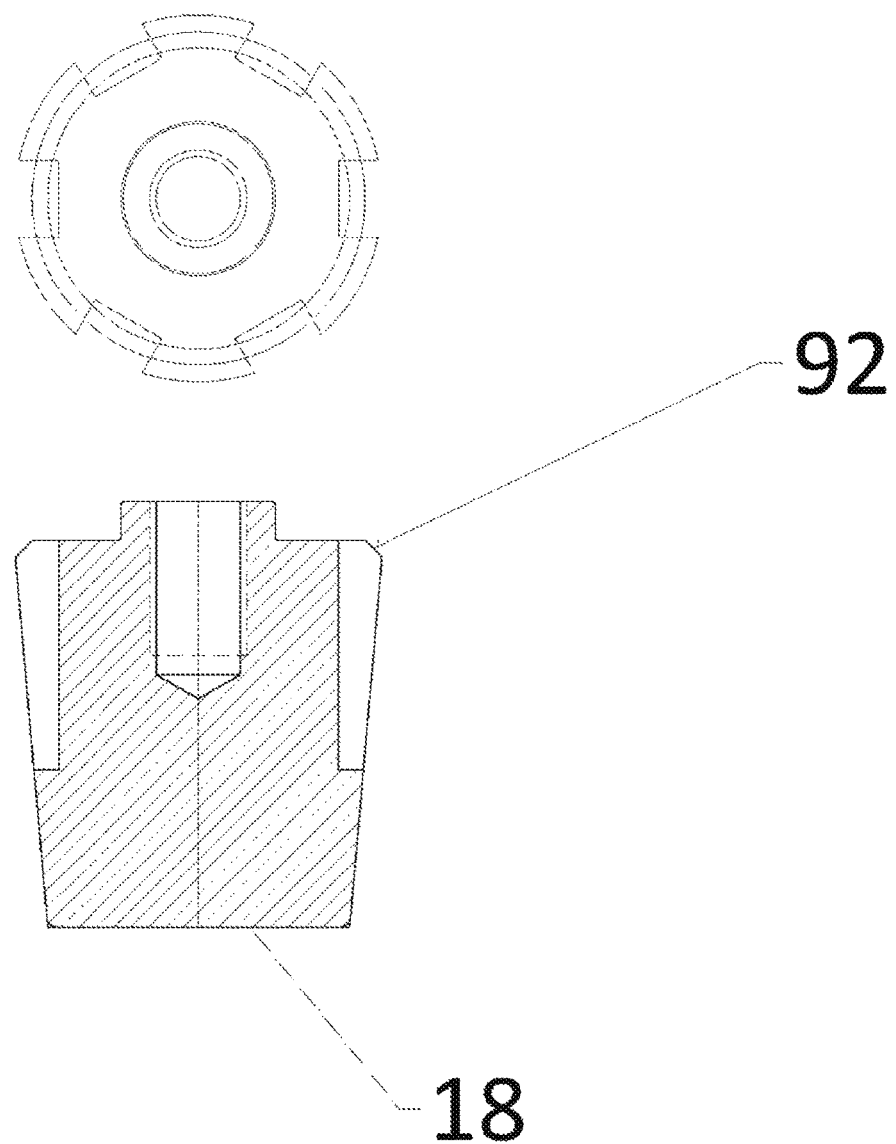
FIG. 8 depicts an embodiment of a plug.

FIG. 8 includes plug 18. Plug 18 includes an annular void 92 or cut out portion. The purpose of this void is to provide more room for fluid flow while cage 15 is moving from a closed position to an open position.

Figure 9:
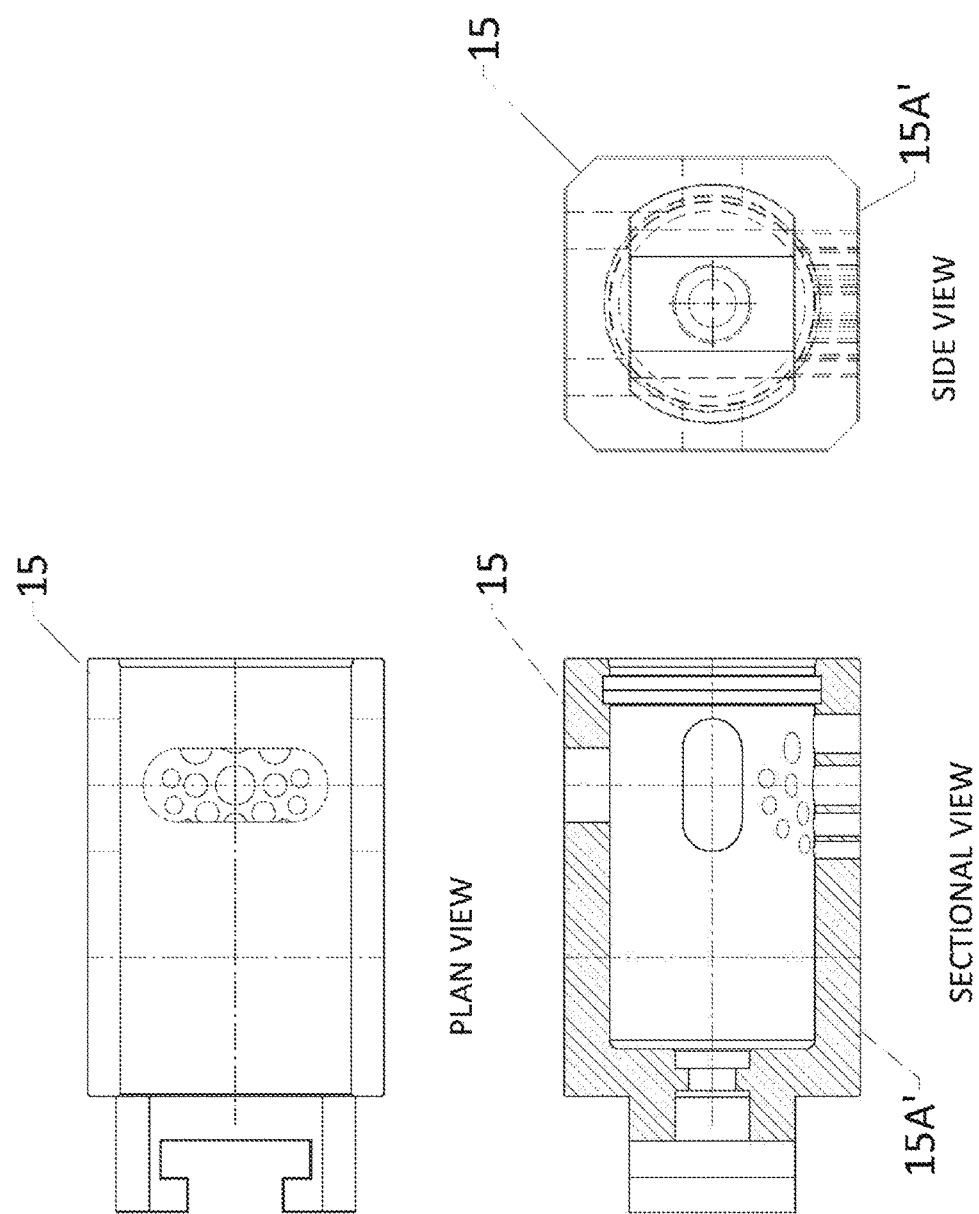
FIG. 9 depicts an embodiment of a cage.

As seen in FIG. 9, in an embodiment cage 15 is not circular in cross-section but instead provides a flat face 15a' with which seat 2 may mate and form a metal-metal seal 2c to provide positive shut off. In an embodiment cage 15 has holes (to allow fluid flow when aligned with holes in the sleeve) on only one side whereas sleeve 17 has holes on more than one side (and is annular or circular in cross-section in contrast with cage 15 to better mate to plug 18). The shapes and configurations of elements such as sleeve 17 and cage 15 may vary in differing embodiments. In some embodiments the cage may be rectangular or square from the outside but on the inside the cage may be circular (i.e., have a curved inner surface to mate with rounded sleeve 17) with holes and/or slots on one or more faces.

Thus, embodiments provide numerous advantages with regard to greater flow control, lessened vibrations, and lower maintenance due to, for example: (1) a plurality of holes in two members (e.g., cage 15 and sleeve 17) that provide graduated flow (in an embodiment the holes are differently sized and in an embodiment the smaller holes are "open" before the larger holes are "open" when initially opening the choke), (2) a seat and opposing support cage guide 37 to dampen vibrations, (3) the flat surface of cage 15 matches "flush" to seat 2 to provide a strong metal-metal seal to provide greater flow control and lower maintenance do elements within body 1, (4) low pressure seal due to spring 35 and seal 34 to provide greater flow control and lower maintenance do elements within body 1, and/or (5) retainer 20 (e.g., retainer 20 holds sleeve 17 in position and, when retainer 20 is properly secured (e.g., screwed in) in the body, retainer 20 prevents interference between sleeve 17 and cage 15 when, for example, the cage is moved into a fully open position). In some embodiments retainer 20 may also operate to keep the sleeve properly aligned and positioned such that while moving the cage into a closed position the cage 15 will not close completely (i.e., will not contact retainer) as the plug interferes with the sleeve before the cage comes to the closed position. This helps ensure the plug fully closes before the cage fully descends, which helps prevent leaks.

Figure 10:
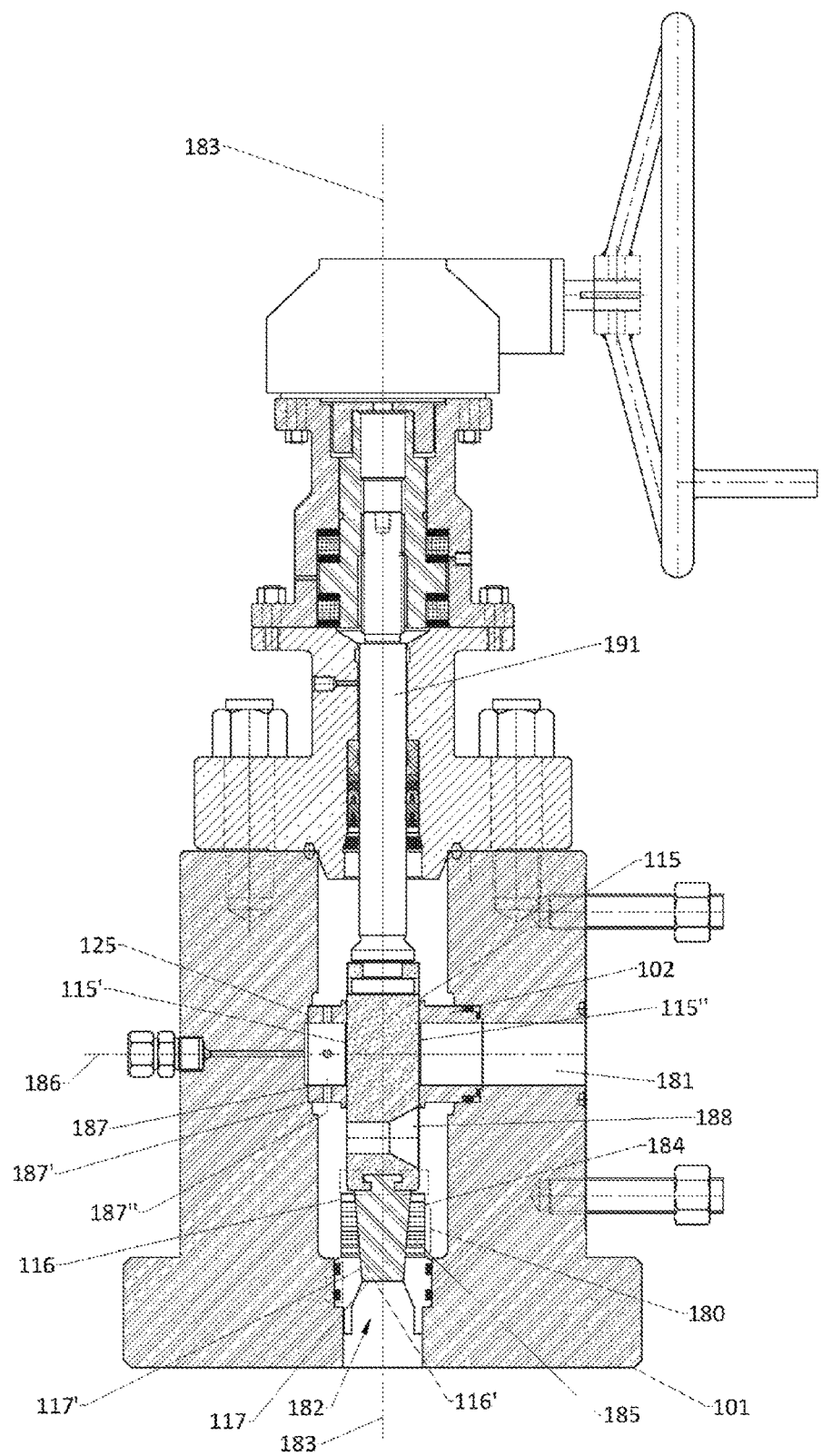
FIGS. 10-11 depict various views of a choke system in an embodiment.
Figure 11:
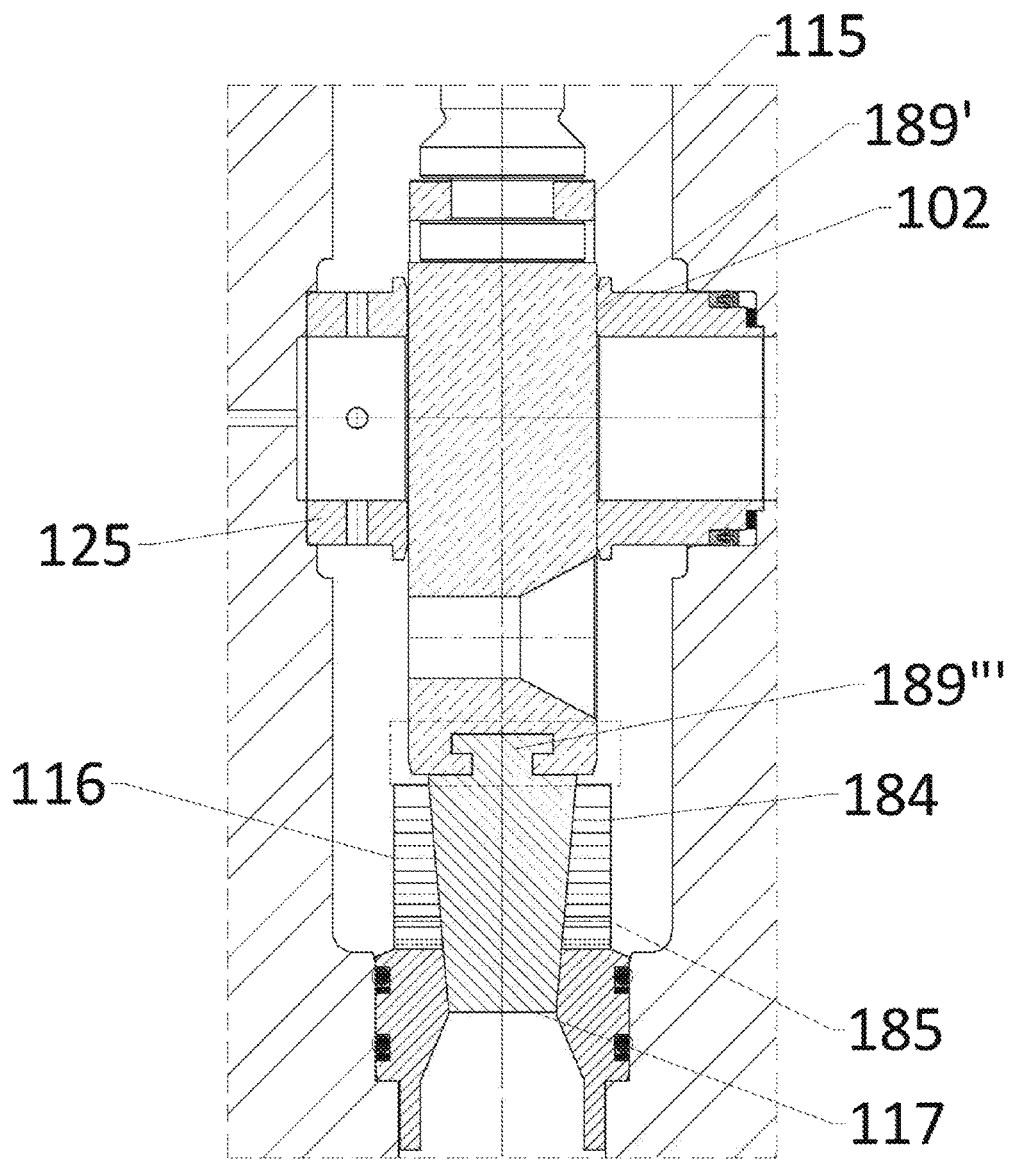
Figure 12:
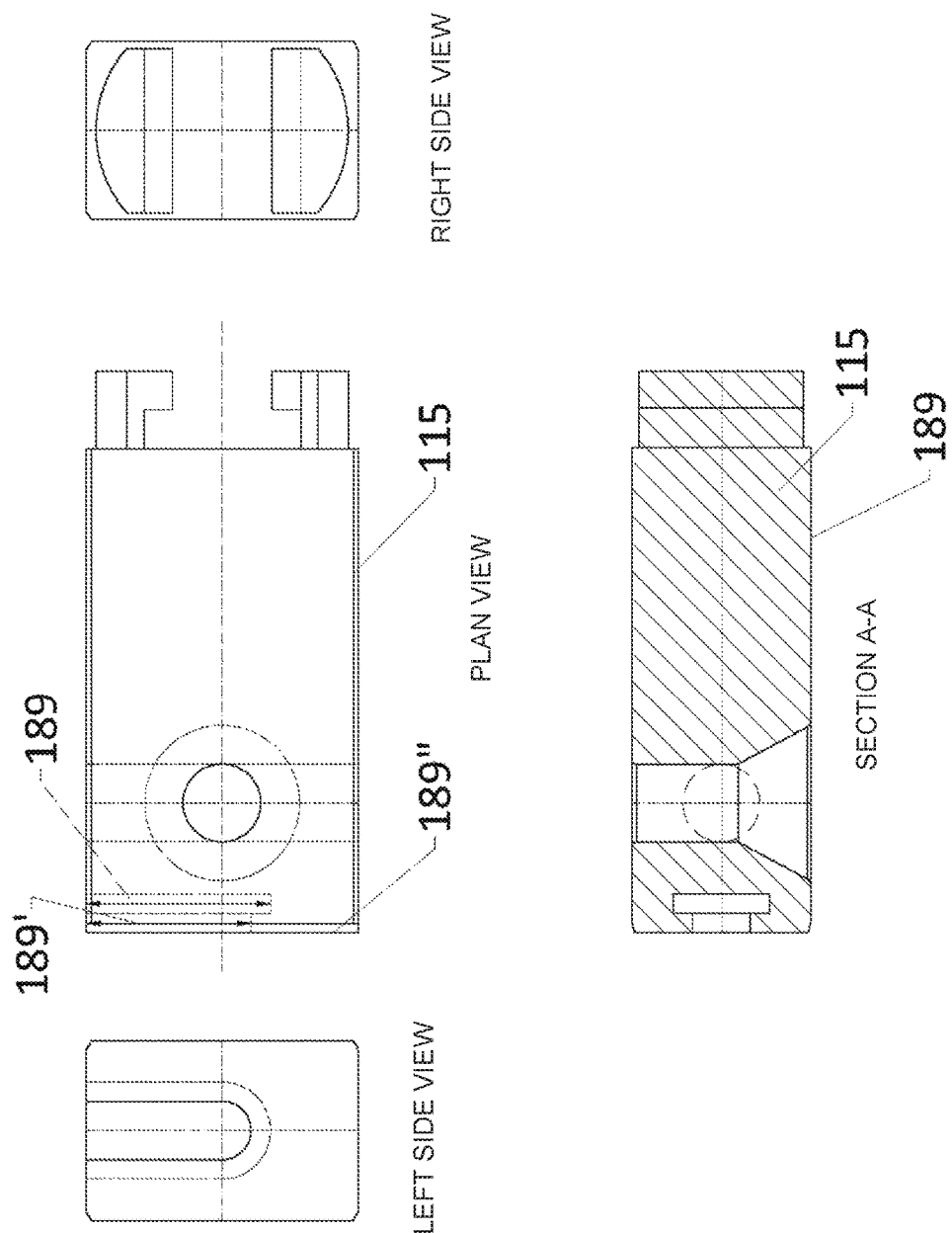
FIG. 12 depicts an embodiment of a gate.

FIGS. 10-12 address an embodiment comprising a seat 102 and a bore is cylindrical or elliptical in shape. The seat 102 bore is parallel or at an angle to the center line 186. Cage 15 of the embodiment of FIG. 4 is replaced by gate 115 of FIG. 10. Unlike cage 15, in an embodiment gate 115 is a rectangular solid block with a funnel type bore. Similar to cage 15, gate 115 also has a flat surface 189 (see FIG. 12) for sealing with a flat surface of seat 102 (FIG. 11). This seal acts a primary seal or positive shut off similar to seal 2C. Wear seat 125 (FIG. 11) is equipped with four through holes or slots of varying dimensions (there may be more holes or less holes in alternative embodiments) along the circumference of the wear seat 125 to avoid pressure trap in the wear seat 125 when the gate 115 moves to a closed position. In this embodiment the plug 117 is attached to the gate 115 on the lower end as shown in FIG. 10 whereas in the cage style (FIG. 4) the plug 18 is attached to the cage 15 on the top side of the cage.

Figure 13:
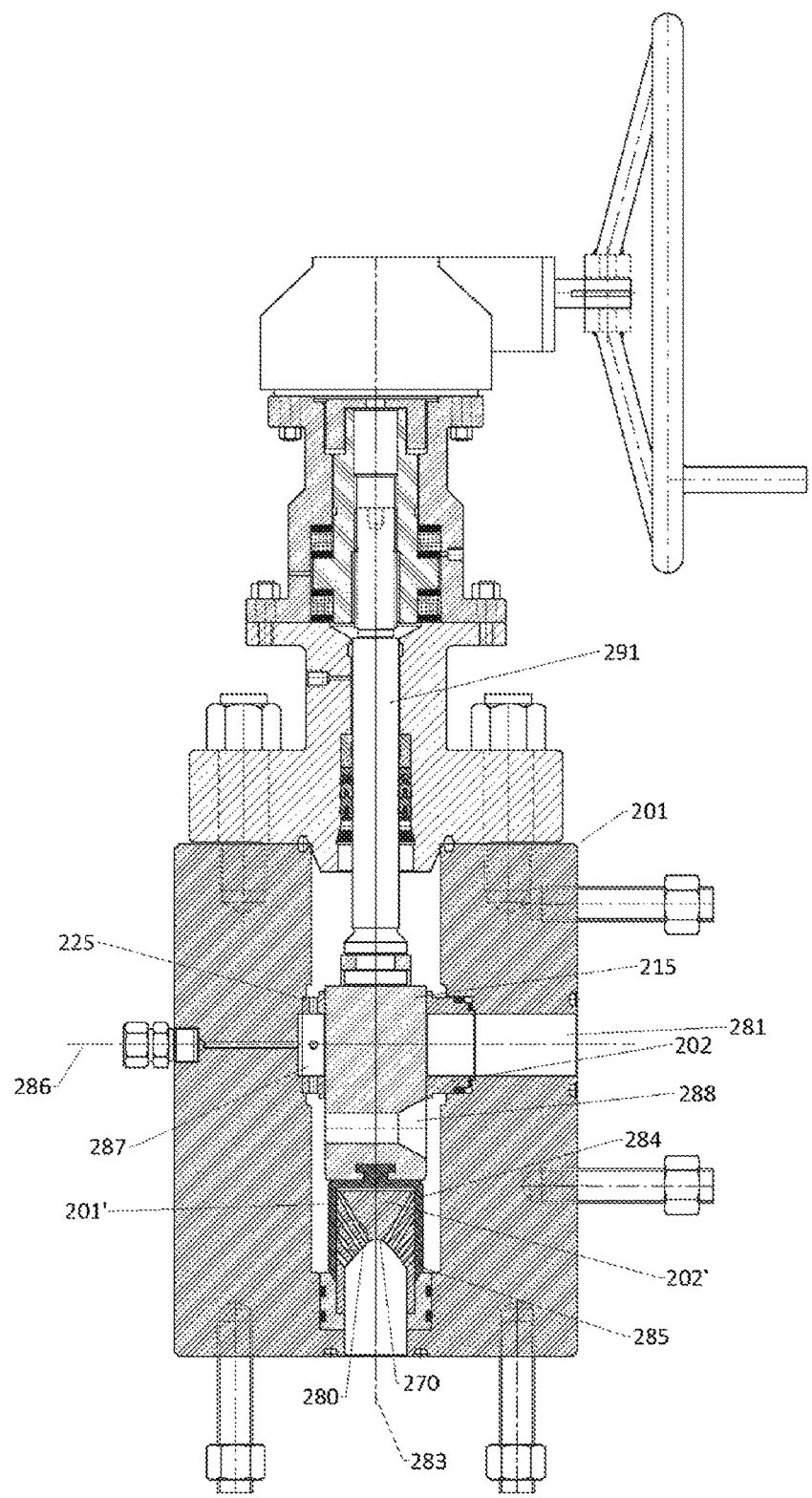
FIG. 13 depicts a choke system in an embodiment.

As shown in the embodiment of FIG. 13, the lower end of the gate can also be connected to an external sleeve 201' over the cage 202' (also referred to herein as a shaft) that has a conical hole 288. This cage has tapered holes or slots of different diameters at an angle to the center axis. The taper angle of the cage 202' (see wall 270) helps the flow to be centralized on the outlet side of the choke. The tapered angle on the lower side of the orifice seat 116 (downstream of plug 117) from FIG. 11 also serves the same purpose.

Regarding the embodiment of FIG. 11, the conical surface of the plug 117 and the orifice seat 116 internal surface (FIG. 11) acts as a secondary sealing area. Orifice seat 116 has multiple holes with different sizes and is secured in place by threads or may slide into an orifice. Flow rate is controlled by the plug 117 and the orifice seat 116. Since there is no restriction to the flow erosion is lessened.

Again concerning FIG. 10, FIG. 10 depicts a choke system comprising: a choke body 101; a gate 115 having first and second sidewalls opposing one another; a first seat116 including a first channel 182 and first conduits 180; a second seat 102 coupling the second sidewall 115" to the choke body and including a second channel 181; a third seat 125 coupling the first sidewall 115' to the choke body; a plug 117 coupled to a bottom surface of the gate; a choke stem 191 coupled to a top surface of the gate; wherein (a) the choke system is to convey fluid through the first channel and first conduits when the gate is open and fluid is pressurized in the second channel, and (b) the first conduits of the first seat have first long axes that are non-collinear with a long axis 183 of the first channel.

The first conduits 180 of the first seat include first and second seat conduits; the first seat conduit 184 includes a first maximum breadth where it interfaces an inner wall of the first seat; the second seat conduit 185 includes a second maximum breadth where it interfaces the inner wall of the first seat; and the first maximum breadth is greater than the second maximum breadth. In an embodiment the first seat conduit 184 is between the second seat conduit 185 and the choke stem 191.

A first axis 183 intersects the plug, the gate, and the choke stem; and a second axis 186, orthogonal to the first axis, intersects seats 125, 102 and the gate when the gate is closed.

Seat 125 includes a third channel 187 and the choke system is to convey the fluid through the first, second, and third channels 182, 181, 187 when the gate is open and fluid is pressurized in the second channel.

A portion 187' of the third channel includes a main axis 187" not parallel to the second axis 186.

The gate 215 includes a channel 188, between the plug and the choke stem, which couples the first and second sidewalls to each other; and the choke system is to convey the fluid through the first, second, third, and fourth channels 182, 181, 187, 188 when the gate is open and fluid is pressurized in the second channel.

The plug includes an outer wall 117'; the first seat includes an inner wall 116' that directly connects to the first conduits 180; and the outer wall of the plug sealingly mates with the inner wall of the first seat to block fluid passage through the first conduits when the gate is closed.

The outer wall 117' of the plug and the inner wall 116' of the first seat are both tapered and non-parallel to the first axis 183.

The second seat 102 directly contacts both the gate 115 and the choke body 101 and the third seat 125 directly contacts both the gate and the choke body.

Each of the first, second, and third seats 116, 102, 125 is removably coupled to the choke body.

The gate includes void; the void includes an inner portion have a first maximum breadth 189 and an outer portion including a second maximum breadth 189' that is less than the first maximum breadth; the outer portion is coplanar with an outer wall 189" of the gate; the plug includes a projection 189''' configured to be retained within the void.

The second sidewall includes a planar face 189; and the second seat includes a planar face 189' that directly contacts the planar face of the second sidewall.

The embodiment of FIG. 13 depicts a choke system comprising: a choke body 201; a gate 215 having first and second sidewalls opposing one another; a first seat 202 coupling the first sidewall to the choke body and including a first channel 281; a second seat 225 coupling the second sidewall to the choke body; a shaft 202' including first conduits 280; a sleeve 201' coupled to a bottom surface of the gate; a choke stem 291 coupled to a top surface of the gate; wherein (a) the choke system is to convey fluid through the first channel and the first conduits when the gate is open and fluid is pressurized in the first channel, (b) a first axis 283 intersects the shaft, the gate, and the choke stem, (c) long axes of the first conduits are non-collinear with the first axis.

The first conduits include first and second shaft conduits; the first shaft conduit 284 includes a first maximum breadth where it interfaces an outer wall of the shaft; the second shaft conduit 285 includes a second maximum breadth where it interfaces the outer wall of the shaft; and the first maximum breadth is greater than the second maximum breadth (however in other embodiments the first maximum breadth is smaller than the second maximum breadth). The first shaft conduit is between the second shaft conduit and the choke stem in an embodiment.

A second axis 286, orthogonal to the first axis, intersects the first and second seats and the gate when the gate is closed. "Intersecting a seat" includes intersecting the channel of seat.

The second seat includes a second channel 287; and the choke system is to convey the fluid through the first and second channels and the first conduits when the gate is open and fluid is pressurized in the first channel.

The gate includes a third channel 288, between the sleeve and the choke stem, which couples the first and second sidewalls to each other; the choke system is to convey the fluid through the first, second, and third channels and the first conduits when the gate is open and fluid is pressurized in the first channel.

The sleeve includes an inner wall; the shaft includes an outer wall that directly connects to the first conduits; and the outer wall of the shaft sealingly mates with the inner wall of the sleeve to block fluid passage through the first conduits when the gate is closed.

The shaft has inner walls 270 that taper inwards towards each other as they move towards the gate.

FIGS. 1-9 depict a choke system comprising: a choke body 1; a sleeve 15 including a second channel 71, first conduits 80, and first and second sidewalls that oppose one another; a shaft 17 including second conduits 80'; a first seat 2 coupling the first sidewall to the choke body and including a first channel 81; a second seat 37 coupling the second sidewall to the choke body; a plug 18; and a choke stem 91 coupled to the plug and the sleeve; wherein (a) the first and second conduits align with one another when the choke system is open and do not align with one another when the choke system is closed, (b) the choke system is to convey fluid through the first channel, second channel, first conduits, and second conduits when the gate is open.

The first conduits include first and second sleeve conduits; the first sleeve conduit 84 (which may include a channel, slit, tunnel, and the like) includes a first maximum breadth where it interfaces an inner wall of the sleeve; the second sleeve conduit 85 includes a second maximum breadth where it interfaces the inner wall of the sleeve; and the first maximum breadth is less than the second maximum breadth (however the first maximum breadth is greater than the second maximum breadth in other embodiments). The first sleeve conduit is between the second sleeve conduit and the choke stem in an embodiment.

A first axis 83 intersects the plug and the choke stem; and a second axis 86, orthogonal to the first axis, intersects the first and second seats and the plug when the choke system is closed.

An outer wall of the plug and an inner wall of the shaft are both tapered and non-parallel to the first axis; each of the first and second seats directly contacts both the sleeve and the choke body; the first sidewall includes a planar face 15a'; and the first seat includes a planar face 15a that directly contacts the planar face of the first sidewall.

Example 1 includes a choke system comprising: a choke body; a gate having first and second sidewalls opposing one another; a first seat including a first channel and first conduits; a second seat coupling the second sidewall to the choke body and including a second channel; a third seat coupling the first sidewall to the choke body; a plug coupled to a bottom surface of the gate; a choke stem coupled to a top surface of the gate; wherein (a) the choke system is to convey fluid through the first channel and first conduits when the gate is open and fluid is pressurized in the second channel, and (b) the first conduits of the first seat have first long axes that are non-collinear with a long axis of the first channel.

"Second conduits" may be an opposing side of the seat from conduits 180.

A "seat" as used herein includes a part of a choke system against which a closure element (e.g., gate, ball, plug) affects a tight shutoff.

Another version of Example 1 includes a choke system comprising: a choke body; a gate having first and second sidewalls opposing one another; a first seat including a first channel and conduits; a second seat coupling the second sidewall to the choke body and including a second channel; a third seat coupling the first sidewall to the choke body; a plug coupled to a surface of the gate; wherein the choke system is to convey fluid through the first channel and conduits when the gate is open.

Another version of Example 1 includes a choke system comprising: a choke body; a gate having first and second sidewalls opposing one another; a first seat including a first channel; a second seat coupling the second sidewall to the choke body and including a second channel; a third seat coupling the first sidewall to the choke body; a plug coupled to a surface of the gate; wherein the choke system is to convey fluid through the first, second, and third channels when the gate is open and wherein a first axis intersects the gate and the first seat and a second axis orthogonal to the first axis intersects the second and third seats.

Such an embodiment does not require conduits such as conduits 180. Other embodiments may not necessarily require conduits but may include a single conduit.

Another version of Example 1 includes a choke system comprising: a choke body; a gate having first and second sidewalls opposing one another; a first seat including a first channel and conduits; a second seat coupling the second sidewall to the choke body and including a second channel; a plug coupled to a surface of the gate; wherein the choke system is to convey fluid through the first channel and conduits when the gate is open.

Such an embodiment does not require seat 125.

Example 2 includes the system of example 1 wherein: the first conduits of the first seat include first and second seat conduits; the first seat conduit includes a first maximum breadth where it interfaces an inner wall of the first seat; the second seat conduit includes a second maximum breadth where it interfaces the inner wall of the first seat; and the first maximum breadth is greater than the second maximum breadth.

Example 3 includes the system of example 2 wherein the first seat conduit is between the second seat conduit and the choke stem.

Example 4 includes the system of example 1 wherein: a first axis intersects the plug, the gate, the choke stem; and a second axis, orthogonal to the first axis, intersects second and third seats and the gate when the gate is closed.

In another version of Example 4 the first axis does not necessarily intersect the choke stem.

Example 5 includes the system of example 1 wherein: the third seat includes a third channel; the choke system is to convey the fluid through the first, second, and third channels when the gate is open and fluid is pressurized in the second channel.

Example 6 includes the system of example 5 wherein: a first axis intersects the plug, the gate, the choke stem; and a second axis, orthogonal to the first axis, intersects the second and third seats and the gate when the gate is closed; and a portion of the third channel includes a main axis not parallel to the second axis.

Example 7 includes the system of example 5 wherein: the gate includes a fourth channel, between the plug and the choke stem, which couples the first and second sidewalls to each other; the choke system is to convey the fluid through the first, second, third, and fourth channels when the gate is open and fluid is pressurized in the second channel.

Example 8 includes the system of example 1 wherein: the plug includes an outer wall; the first seat includes an inner wall that directly connects to the first conduits; and the outer wall of the plug sealingly mates with the inner wall of the first seat to block fluid passage through the first conduits when the gate is closed.

Example 9 includes the system of example 8 wherein: a first axis intersects the plug, the gate, the choke stem; and the outer wall of the plug and the inner wall of the first seat are both tapered and non-parallel to the first axis.

Example 10 includes the system of example 1 wherein: the second seat directly contacts both the gate and the choke body; the third seat directly contacts both the gate and the choke body.

Example 11 includes the system of example 1 wherein each of the first, second, and third seats is removably coupled to the choke body.

Example 12 includes the system of example 1 wherein: the gate includes void; the void includes an inner portion have a first maximum breadth and an outer portion including a second maximum breadth that is less than the first maximum breadth; the outer portion is coplanar with an outer wall of the gate; the plug includes a projection configured to be retained within the void.

Example 13 includes the system of example 1 wherein: the second sidewall includes a planar face; and the second seat includes a planar face that directly contacts the planar face of the second sidewall.

Example 13a includes the system of example 1 comprising a spring that biases the second seat against the gate.

Example 13b includes the system of example 1 wherein the third seat includes at least two conduits that have main axes not parallel to a main axis of the second channel.

Example 13c includes a manifold system includes first and second chokes, (I) the first choke comprising: a choke body; a gate having first and second sidewalls opposing one another; a first seat including a first channel and first conduits; a second seat coupling the second sidewall to the choke body and including a second channel; a third seat coupling the first sidewall to the choke body; a plug coupled to a bottom surface of the gate; a choke stem coupled to a top surface of the gate; wherein (a) the choke system is to convey fluid through the first channel and first conduits when the gate is open and fluid is pressurized in the second channel, and (b) the first conduits of the first seat have first long axes that are non-collinear with a long axis of the first channel, and (II) the second choke comprising: a choke body; a gate having first and second sidewalls opposing one another; a first seat including a first channel and first conduits; a second seat coupling the second sidewall to the choke body and including a second channel; a third seat coupling the first sidewall to the choke body; a plug coupled to a bottom surface of the gate; a choke stem coupled to a top surface of the gate; wherein (a) the choke system is to convey fluid through the first channel and first conduits when the gate is open and fluid is pressurized in the second channel, and (b) the first conduits of the first seat have first long axes that are non-collinear with a long axis of the first channel.

Example 13d includes the system of example 1 wherein: the second sidewall includes a planar face; the second seat includes a planar face that directly contacts the planar face of the second sidewall; the first channel has a first minimum breadth; and the second channel has a second minimum breadth that is greater than the first minimum breadth.

Thus, this example clearly distinguishes between a choke system (where an upstream/input channel has a larger diameter to accommodate a higher pressure stream and the downstream/output channel has a smaller diameter to accommodate a lower pressure stream) and a mere valve (where the upstream/input and downstream/output channels have the same minimum diameters because they are configured to handle equal pressure input and output streams). Valves do not focus on controlling downstream pressure the way chokes do.

For this example the "minimum breadth" for seat 116 (FIG. 10) is at its most downstream portion and the "minimum breadth" for seat 102 is taken anywhere along channel 181 because the breadth is unchanging along the channel.

Example 14 includes a choke system comprising: a choke body; a gate having first and second sidewalls opposing one another; a first seat coupling the first sidewall to the choke body and including a first channel; a second seat coupling the second sidewall to the choke body; a shaft including first conduits; a sleeve coupled to a bottom surface of the gate; a choke stem coupled to a top surface of the gate; wherein (a) the choke system is to convey fluid through the first channel and the first conduits when the gate is open and fluid is pressurized in the first channel, (b) a first axis intersects the shaft, the gate, and the choke stem, (c) long axes of the first conduits are non-collinear with the first axis.

Another version of Example 14 includes a choke system comprising: a choke body; a gate having first and second sidewalls opposing one another; a first seat coupling the first sidewall to the choke body and including a first channel; a second seat coupling the second sidewall to the choke body; a member including first conduits; a sleeve coupled to a bottom surface of the gate and configured to slide over the member; wherein (a) the choke system is to convey fluid through the first channel and the first conduits when the gate is open and fluid is pressurized in the first channel, (b) a first axis intersects the shaft, and the gate.

Another example of Example 14 includes a choke system comprising: a choke body; a gate having first and second sidewalls opposing one another; a first seat coupling the first sidewall to the choke body and including a first channel; a shaft including first conduits; a sleeve coupled to a bottom surface of the gate; wherein (a) the choke system is to convey fluid through the first channel and the first conduits when the gate is open and fluid is pressurized in the first channel, (b) a first axis intersects the shaft and the gate, and (c) long axes of the first conduits are non-collinear with the first axis.

Thus, the second seat 225 is not essential to this embodiment.

Another version of Example 14 includes a choke system comprising: a choke body; a gate having first and second sidewalls opposing one another; a first seat coupling the first sidewall to the choke body and including a first channel; a second seat coupling the second sidewall to the choke body; a shaft including a conduit; a sleeve coupled to a bottom surface of the gate; a choke stem coupled to a top surface of the gate; wherein (a) the choke system is to convey fluid through the first channel and the conduit when the gate is open and fluid is pressurized in the first channel, (b) a first axis intersects the shaft, the gate, and the choke stem.

In this embodiment the shaft does not necessarily include multiple conduits.

Another version of Example 14 includes a manifold system includes first and second chokes, (I) the first choke system comprising: a choke body; a gate having first and second sidewalls opposing one another; a first seat coupling the first sidewall to the choke body and including a first channel; a second seat coupling the second sidewall to the choke body; a shaft including first conduits; a sleeve coupled to a bottom surface of the gate; a choke stem coupled to a top surface of the gate; wherein (a) the choke system is to convey fluid through the first channel and the first conduits when the gate is open and fluid is pressurized in the first channel, (b) a first axis intersects the shaft, the gate, and the choke stem, (c) long axes of the first conduits are non-collinear with the first axis, and (II) the second choke system comprising: a choke body; a gate having first and second sidewalls opposing one another; a first seat coupling the first sidewall to the choke body and including a first channel; a second seat coupling the second sidewall to the choke body; a shaft including first conduits; a sleeve coupled to a bottom surface of the gate; a choke stem coupled to a top surface of the gate; wherein (a) the choke system is to convey fluid through the first channel and the first conduits when the gate is open and fluid is pressurized in the first channel, (b) a first axis intersects the shaft, the gate, and the choke stem, (c) long axes of the first conduits are non-collinear with the first axis.

Example 15 includes the system of example 14 wherein: the first conduits include first and second shaft conduits; the first shaft conduit includes a first maximum breadth where it interfaces an outer wall of the shaft; the second shaft conduit includes a second maximum breadth where it interfaces the outer wall of the shaft; and the first maximum breadth is greater than the second maximum breadth.

Example 16 includes the system of example 15 wherein the first shaft conduit is between the second shaft conduit and the choke stem.

Example 17 includes the system of example 14 wherein a second axis, orthogonal to the first axis, intersects the first and second seats and the gate when the gate is closed.

Example 18 includes the system of example 14 wherein: the second seat includes a second channel; and the choke system is to convey the fluid through the first and second channels and the first conduits when the gate is open and fluid is pressurized in the first channel.

Example 19 includes the system of example 18 wherein: the gate includes a third channel, between the sleeve and the choke stem, which couples the first and second sidewalls to each other; the choke system is to convey the fluid through the first, second, and third channels and the first conduits when the gate is open and fluid is pressurized in the first channel.

Example 20 includes the system of example 14 wherein: the sleeve includes an inner wall; the shaft includes an outer wall that directly connects to the first conduits; and the outer wall of the shaft sealingly mates with the inner wall of the sleeve to block fluid passage through the first conduits when the gate is closed.

Example 21 includes the system of example 14 wherein the shaft has inner walls that taper inwards towards each other as they move towards the gate.

Example 22 includes a choke system comprising: a choke body; a sleeve including a second channel, first conduits, and first and second sidewalls that oppose one another; a shaft including second conduits; a first seat coupling the first sidewall to the choke body and including a first channel; a second seat coupling the second sidewall to the choke body; a plug; and a choke stem coupled to the plug and the sleeve; wherein (a) the first and second conduits align with one another when the choke system is open and do not align with one another when the choke system is closed, (b) the choke system is to convey fluid through the first channel, second channel, first conduits, and second conduits when the gate is open.

Example 23 includes the system of example 22 wherein: the first conduits include first and second sleeve conduits; the first sleeve conduit includes a first maximum breadth where it interfaces an inner wall of the sleeve; the second sleeve conduit includes a second maximum breadth where it interfaces the inner wall of the sleeve; and the first maximum breadth is less than the second maximum breadth.

Example 24 includes the system of example 23 wherein the first sleeve conduit is between the second sleeve conduit and the choke stem.

Example 25 includes the system of example 22 wherein: a first axis intersects the plug and the choke stem; and a second axis, orthogonal to the first axis, intersects the first and second seats and the plug when the choke system is closed.

Example 26 includes the system of example 22 wherein: an outer wall of the plug and an inner wall of the shaft are both tapered and non-parallel to the first axis;

each of the first and second seats directly contacts both the sleeve and the choke body; the first sidewall includes a planar face; and the first seat includes a planar face that directly contacts the planar face of the first sidewall.

Embodiments of the above examples comprise adjustable choke systems having open, closed, and partially open choke stages that may be held statically and the partially open choke stage does not merely occur during a transition between the open and closed stages but instead may be held statically if so chosen by the user.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a device side is the "top" surface of that device; the device may actually be in any orientation so that a "top" side of a substrate may be lower than the "bottom" side in a standard terrestrial frame of reference and still fall within the meaning of the term "top." The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A choke system comprising:
   a choke body;
   a gate having first and second sidewalls opposing one another;
   a first seat including a first channel and first conduits;
   a second seat coupling the second sidewall to the choke body and including a second channel;
   a third seat coupling the first sidewall to the choke body;
   a plug coupled to a bottom surface of the gate; and
   a choke stem coupled to a top surface of the gate;
   wherein: (a) the choke system is to convey fluid through the first channel and first conduits when the gate is open and fluid is pressurized in the second channel, and (b) the first conduits of the first seat have first long axes that are non-collinear with a first axis of the first channel;
   wherein: (c) the third seat includes a third channel; and (d) the choke system is to convey the fluid through the first, second, and third channels when the gate is open and fluid is pressurized in the second channel;
   wherein: (e) the first axis intersects the plug, the gate, and the choke stem; (f) a second axis, orthogonal to the first axis, intersects the second and third seats and the gate when the gate is closed; and (g) a portion of the third channel includes a main axis not parallel to the second axis;
   wherein: (h) the second sidewall includes a planar face; and (i) the second seat includes a planar face that directly contacts the planar face of the second sidewall.

2. The system of claim 1 wherein:
   the first conduits of the first seat include first and second seat conduits;
   the first seat conduit includes a first maximum breadth where it interfaces an inner wall of the first seat;
   the second seat conduit includes a second maximum breadth where it interfaces the inner wall of the first seat; and
   the first maximum breadth is greater than the second maximum breadth.

3. The system of claim 2 wherein the first seat conduit is between the second seat conduit and the choke stem.

4. The system of claim 1 wherein:
   the gate includes a fourth channel, between the plug and the choke stem, which couples the first and second sidewalls to each other;
   the choke system is to convey the fluid through the first, second, third, and fourth channels when the gate is open and fluid is pressurized in the second channel.

5. The system of claim 1 wherein:
   the plug includes an outer wall;
   the first seat includes an inner wall that directly connects to the first conduits; and
   the outer wall of the plug sealingly mates with the inner wall of the first seat to block fluid passage through the first conduits when the gate is closed.

6. The system of claim 5 wherein:
   the outer wall of the plug and the inner wall of the first seat are both tapered and non-parallel to the first axis.

7. The system of claim 1 wherein:
   the second seat directly contacts both the gate and the choke body;
   the third seat directly contacts both the gate and the choke body.

8. The system of claim 1 wherein:
   the gate includes a void;
   the void includes an inner portion having a first maximum breadth and an outer portion including a second maximum breadth that is less than the first maximum breadth;
   the outer portion is coplanar with an outer wall of the gate;
   the plug includes a projection configured to be retained within the void;
   a space between the projection and walls of the void, when the projection is retained within the void, allows the plug to rotate independently of the gate.

9. The system of claim 1 comprising a resilient member between the second seat and the valve body, wherein the resilient member biases the second seat towards the gate.

10. The system of claim 1 wherein:
    the first channel has a first minimum breadth; and
    the second channel has a second minimum breadth that is greater than the first minimum breadth.

11. A choke system comprising:
    a choke body;
    a gate having first and second sidewalls opposing one another;
    a first seat including a first channel and first conduits;
    a second seat coupling the second sidewall to the choke body and including a second channel;
    a third seat coupling the first sidewall to the choke body;
    a plug coupled to a bottom surface of the gate;
    a choke stem coupled to a top surface of the gate; and
    a resilient member between the second seat and the valve body, wherein the resilient member biases the second seat towards the gate;
    wherein (a) the choke system is to convey fluid through the first channel and first conduits when the gate is open and fluid is pressurized in the second channel, and (b) the first conduits of the first seat have first long axes that are non-collinear with a first axis of the first channel;
    wherein: (c) the second sidewall includes a planar face; and (d) the second seat includes a planar face that directly contacts the planar face of the second sidewall.

12. The system of claim 11 wherein:
    the first conduits of the first seat include first and second seat conduits;
    the first seat conduit includes a first maximum breadth where it interfaces an inner wall of the first seat;
    the second seat conduit includes a second maximum breadth where it interfaces the inner wall of the first seat; and
    the first maximum breadth is greater than the second maximum breadth.

13. The system of claim 12 wherein the first seat conduit is between the second seat conduit and the choke stem.

14. The system of claim 11 wherein:
the first axis intersects the plug, the gate, and the choke stem; and
a second axis, orthogonal to the first axis, intersects the second and third seats and the gate when the gate is closed.

15. The system of claim 14 wherein:
the gate includes a fourth channel, between the plug and the choke stem, which couples the first and second sidewalls to each other;
the choke system is to convey the fluid through the first, second, third, and fourth channels when the gate is open and fluid is pressurized in the second channel.

16. The system of claim 11 wherein:
the plug includes an outer wall;
the first seat includes an inner wall that directly connects to the first conduits; and
the outer wall of the plug sealingly mates with the inner wall of the first seat to block fluid passage through the first conduits when the gate is closed.

17. The system of claim 16 wherein:
the first axis intersects the plug, the gate, and the choke stem; and
the outer wall of the plug and the inner wall of the first seat are both tapered and non-parallel to the first axis.

18. The system of claim 11 wherein:
the second seat directly contacts both the gate and the choke body;
the third seat directly contacts both the gate and the choke body.

19. The system of claim 11 wherein:
the gate includes a void;
the void includes an inner portion having a first maximum breadth and an outer portion including a second maximum breadth that is less than the first maximum breadth;
the outer portion is coplanar with an outer wall of the gate;
the plug includes a projection configured to be retained within the void;
when the projection is retained within the void the projection is oriented within the void to allow the plug to wiggle with regard to the gate.

20. The system of claim 11 wherein:
the first channel has a first minimum breadth; and
the second channel has a second minimum breadth that is greater than the first minimum breadth.

* * * * *